Nov. 4, 1924.
J. C. MEIGHAN
1,514,005
LOCOMOTIVE RUNNING GEAR ATTACHMENT FOR TRACTORS
Filed Aug. 8, 1921     2 Sheets-Sheet 1
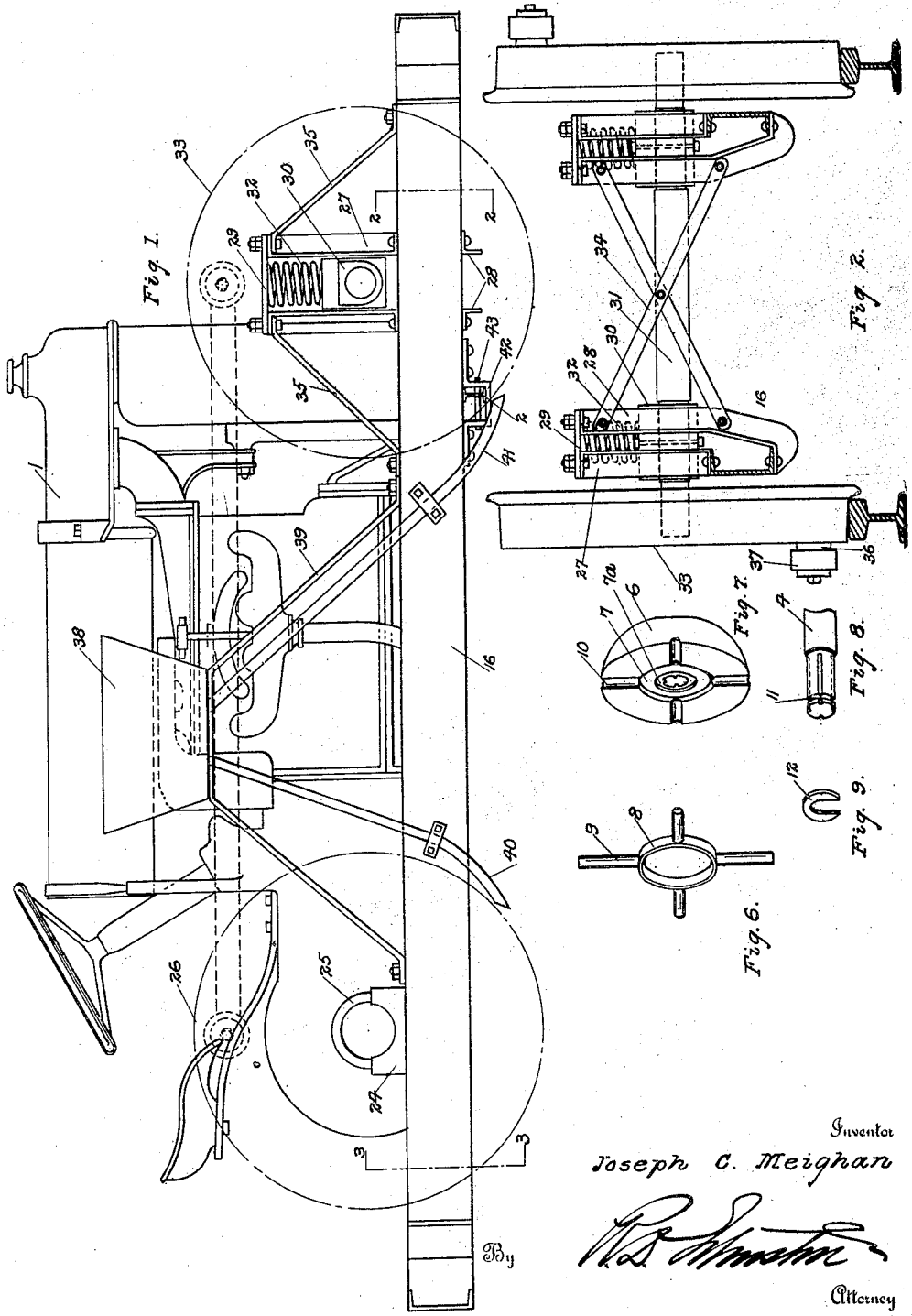

Nov. 4, 1924.  1,514,005
J. C. MEIGHAN
LOCOMOTIVE RUNNING GEAR ATTACHMENT FOR TRACTORS
Filed Aug. 8, 1921  2 Sheets-Sheet 2
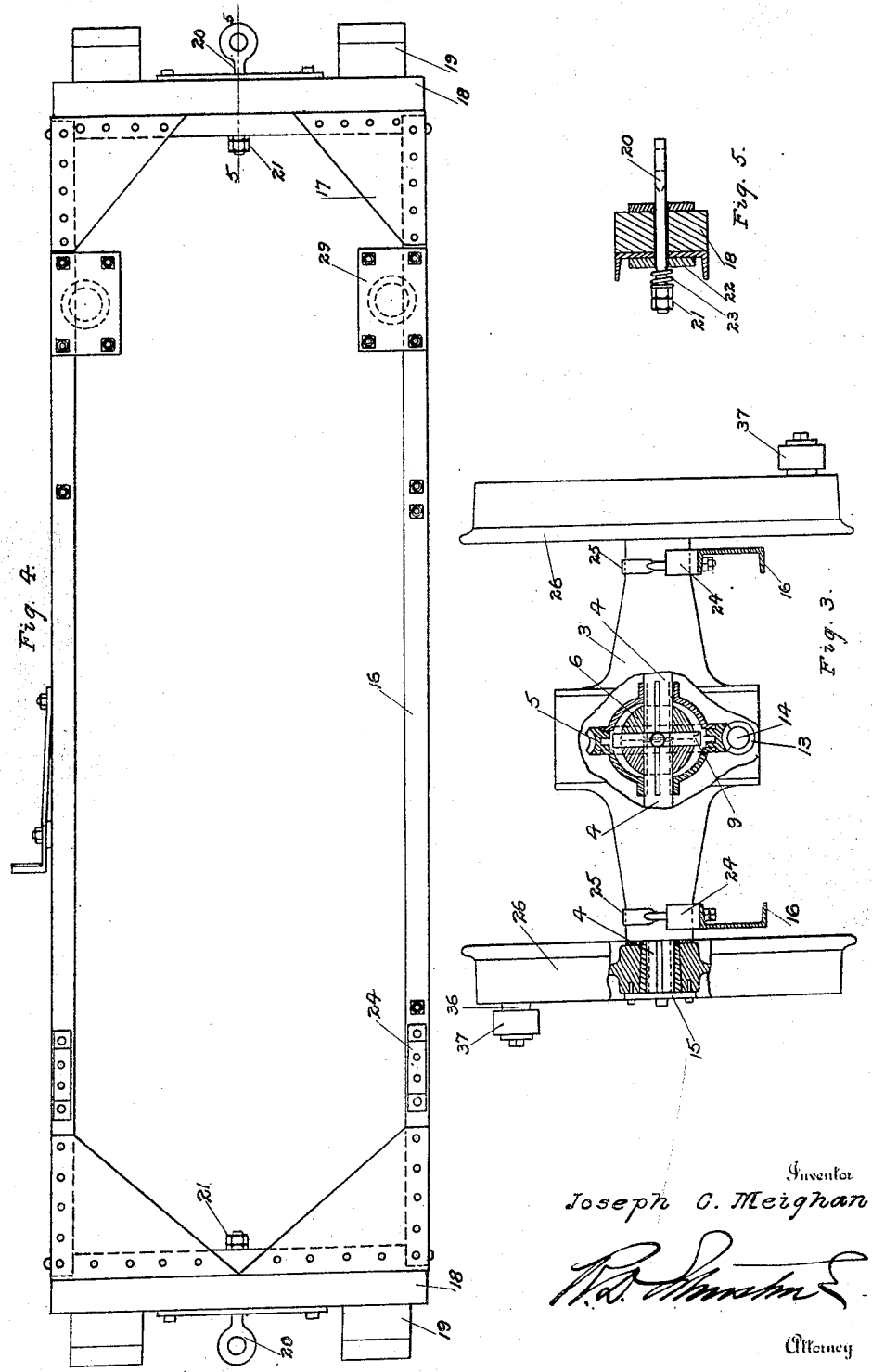
Inventor
Joseph C. Meighan
Attorney Patented Nov. 4, 1924.

1,514,005

UNITED STATES PATENT OFFICE.

JOSEPH C. MEIGHAN, OF BIRMINGHAM, ALABAMA, ASSIGNOR TO E. T. SANBORN, OF BIRMINGHAM, ALABAMA, DOING BUSINESS AS W. T. SANBORN & COMPANY.

LOCOMOTIVE RUNNING-GEAR ATTACHMENT FOR TRACTORS.

Application filed August 8, 1921. Serial No. 490,512.

*To all whom it may concern:*

Be it known that I, JOSEPH C. MEIGHAN, a citizen of the United States of America, residing at Birmingham, in the county of Jefferson and State of Alabama, have invented certain new and useful Improvements in Locomotive Running-Gear Attachments for Tractors, of which the following is a specification.

My invention relates to a running gear attachment for the ready conversion of automobile tractors into locomotives suitable for handling mine cars, logging trains and the like, to the end that in a simple and inexpensive manner a tractor may be adapted to such uses without preventing its ready conversion back for use as a tractor.

A further important feature of my invention relates to the construction of a rigid metallic frame, having the general character of an elongated four wheel truck frame, with suitable means for mounting the tractor thereon, the rear truck wheels being mounted on the rear axles of the tractor and the forward wheels being preferably mounted on an axle which supports the forward end of the truck on equalizing springs.

A further object of my invention is to design means for the ready and inexpensive conversion of the rear differential drive of the tractor into a positive non-differential drive, which is essential in view of the fact that the front and rear wheels on each side of the truck are to be coupled by connecting rods. It is a feature of my invention that this change in drive can be readily accomplished by the substitution for standard differential driving elements of the tractor of comparatively inexpensive coupling parts, which can be readily removed and the standard differential gear drive parts replaced.

My invention also comprises the novel details of construction and arrangements of parts, which, in their preferred embodiment only, are illustrated in the accompanying drawings, in which:—

Fig. 1 is a side elevation of a railway truck attachment for tractors, with a typical tractor mounted thereon, the wheels being shown in dotted lines.

Fig. 2 is a front cross sectional view taken on the line 2—2 of Fig. 1 and illustrating the truck frame only.

Fig. 3 is a similar view taken on the line 3—3 of Fig. 2 with the differential housing broken away to show the positive driving coupling for the rear tractor axles substituted for the differential driving gears.

Fig. 4 is a plan view of the truck frame.

Fig. 5 is a detail view taken on the line 5—5 of Fig. 4 and showing a swivel coupler for the truck frame.

Fig. 6 is a perspective view of a standard type of differential gear spider.

Fig. 7 is a detail perspective view of a positive coupling member.

Fig. 8 is an end view of a rear axle on which the coupling is adapted to be mounted; and Fig. 9 is a clip for holding the coupling on the axle.

Similar reference numerals refer to similar parts throughout the drawings.

I have illustrated my invention in connection with a typical tractor engine 1 having a front axle 2 and a rear axle housing 3 in which are mounted two axle shafts 4 having any desired type of bearing and having their inner ends which enter the chamber for the worm wheel 5 in the housing provided with slots adapted to receive the splines on semi-globular coupling members 6, which take the place of the present differential gears and fit snugly into the space provided for them. This semi-globular coupling, which is illustrated in Fig. 7, has a countersunk recess 7 in the center of its flat face which is adapted to receive the center ring 8 of the spider on the radial shafts 9 on which are normally mounted the differential gears. These gears in my invention are removed and the shafts 9 are adapted to interfit in registering radial slots 10 in the abutting faces of the couplings 6. The inner end of each axle projects into the countersunk seat 7 in its coupling 6 and is circumferentially grooved at 11 to receive a U-shaped clip 12 which straddles it and locks the coupling on its respective shaft. The spider ring 8 is seated partly in each countersunk seat 7 and its shafts 9 are enclosed between the semi-circular grooves 10 so as to form a semi-rigid coupling which will lock the two rear axle shafts together for joint drive from the worm 13 on the main drive shaft 14, which worm meshes the worm wheel 5. The ends of the shafts 9 are received in sockets in the worm wheel 5 which thus serves to drive the rear axle through the couplings 6. The axles at their outer ends are equipped with any standard type of hub bushings 15 by means of which tractor wheels are adapted to be mounted fast thereon. The tractor, with the exception of the change in its differential drive already described and the change of its wheels, is not otherwise modified in adapting it for use according to my present invention.

To convert the tractor into a locomotive I provide a truck frame 16 preferably fabricated from structural steel channels suitably braced at their corners by plates 17 and having across their front and rear ends wooden sills 18 carrying bumpers 19 and a swivelled coupling 20 in the form of an eye bolt free to slide through the end beam and the end of the truck frame and having connected to its inner end nuts 21, between which and the plate 22 I mount a coiled compression spring 23. It is to be understood, however, that this type of coupling may be variously modified.

Near the rear end of the truck frame, in transverse alignment, I mount a pair of bearings 24 in which the outer ends of the rear axle housing are adapted to seat and I secure the housing to the bearings and the bearings to the truck frame by clips 25. The ends of the housing overhang beyond the sides of the truck frame and I mount upon the ends of each axle 4 a car wheel 26 and secure it in place by the hub bushing 15 in the same manner that the rear tractor wheels were mounted on the axle. Near the forward end of the truck frame I mount, in transverse alignment, pedestals each formed by a spaced pair of outer angles 27 having out-turned flanges bolted to the top of the truck frame and a spaced pair of inner angles 28 bent outwardly and attached to the bottom of the truck frame, all four angles at their upper ends being bolted to a top plate 29 which holds them rigidly in spaced relationship so that they form a pedestal for a journal bearing 30 for the front axle 31. A spring 32 is interposed in each pedestal above the journal to permit the front axle to rock freely in a vertical transverse plane to accommodate itself to track inequalities. A pair of car wheels 33 are mounted fast on the outer ends of the front axle 31 and the pedestals are cross braced by intersecting bars 34 which gives an extremely rigid but light construction. The pedestals are also braced from front to rear by bars 35 leading therefrom downwardly in opposite directions and bolted to the truck frame. All of the wheels 26 and 33 are provided with crank pins 36 and connecting rods 37 are applied to couple the wheels on the same side of the truck. If desired a sand box 38 is mounted on a suitable support 39 on the side of the truck frame, and by means of sand pipes 40 and 41 I supply sand to the track for the wheels on either or both sides. The forward tractor axle 2 is mounted in brackets 42 bolted to the underside of the truck frame and I insert a bolt or pin 43 through each bracket and the axle to prevent the tractor's lateral displacement. As thus mounted in the truck frame the tractor engine, through its driving connection to all four wheels, is capable of exerting high tractive force and of furnishing a relatively inexpensive and efficient locomotive for various uses and especially for handling mine cars and logging trains.

To reconvert the tractor to its normal uses, it is only necessary to remove brackets 42 and clips 25, which will permit the tractor, after removal of the car wheels 26, to be dismounted from the truck frame 16, whereupon the tractor wheels are remounted on their axles and the differential housing is opened up so that the couplings 6 can be removed and replaced by the gears which will mesh with the gears to be mounted on the differential spider, thus restoring the differential gear drive in the rear housing with a minimum disturbance of the latter. When I refer to the rear axle of the tractor I mean to include any type of axle whether in one or more parts.

This invention is not intended to be restricted in scope to the specific embodiments shown, but contemplates such modifications as come within the spirit and scope of the claims.

Having thus described my invention, what I claim as new and desire to secure by Letters Patent, is:—

1. In combination, a tractor, a railway truck having a forward axle and wheels therefor, means to mount the tractor on the truck in position to receive on its rear axles the rear truck wheels, and means to drive said axles non-differentially comprising a pair of hemi-spherical couplings keyed on the adjacent axle ends and grooved to receive between them and be interlocked by a differential spider, and means to drive the couplings through said spider.

2. In combination, a tractor having a rear axle housing, rear axles journaled therein, a worm wheel, a driving worm for the wheel, a differential spider driven by said worm wheel, coupling elements adapted to replace the differential gearing, means to secure said coupling elements in interlocked relationship with the rear axles and the spider, means to mount said tractor on a railway truck, and means to mount car wheels serving as drivers on the tractor's rear axles.

In testimony whereof I affix my signature.

JOSEPH C. MEIGHAN.

Witness:
  NOMIE WELSH.